Dec. 26, 1933.    J. H. HAND    1,940,947
CLUTCH MECHANISM
Filed June 1, 1931    2 Sheets-Sheet 1
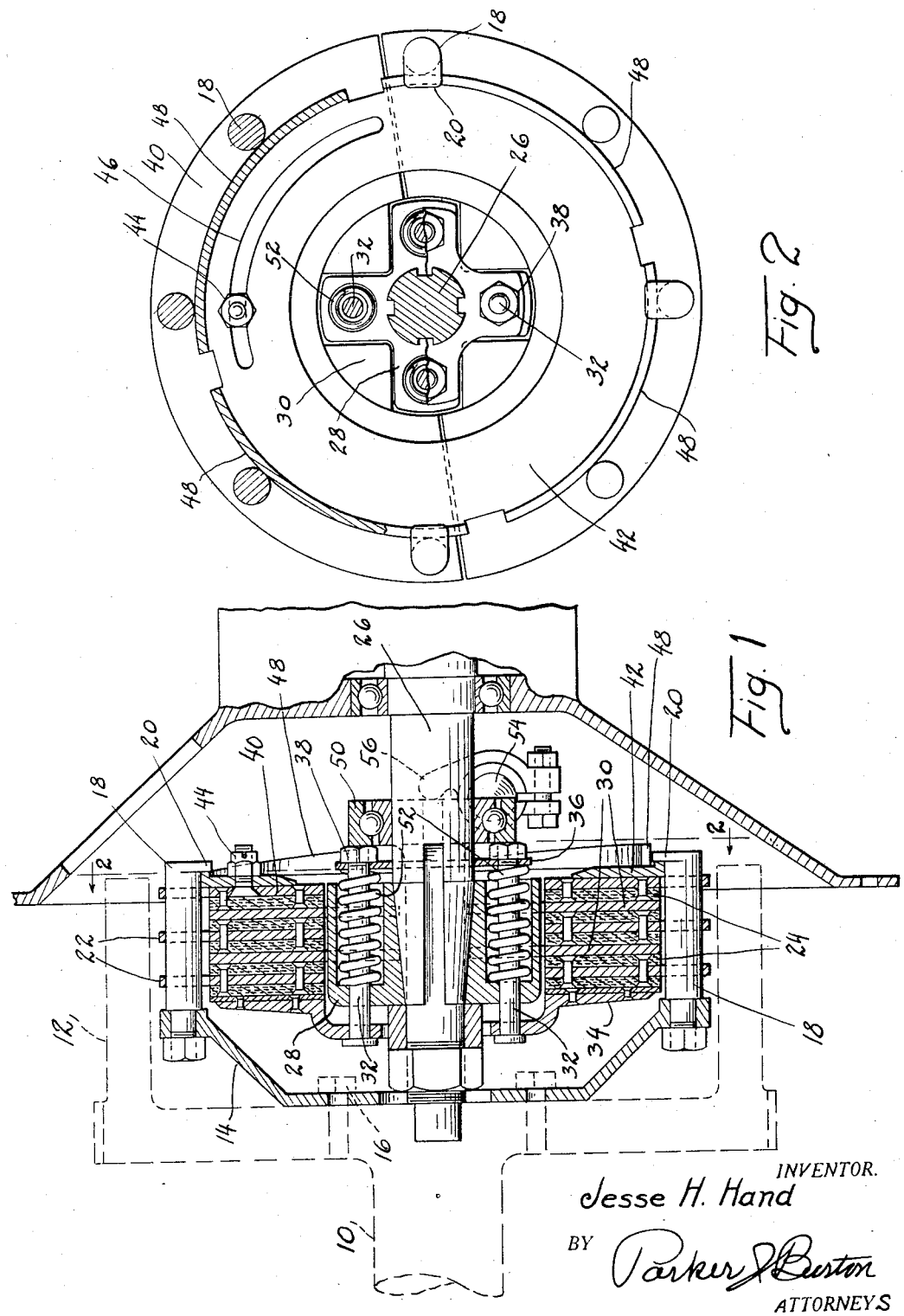
INVENTOR.
Jesse H. Hand
BY Parker Burton
ATTORNEYS

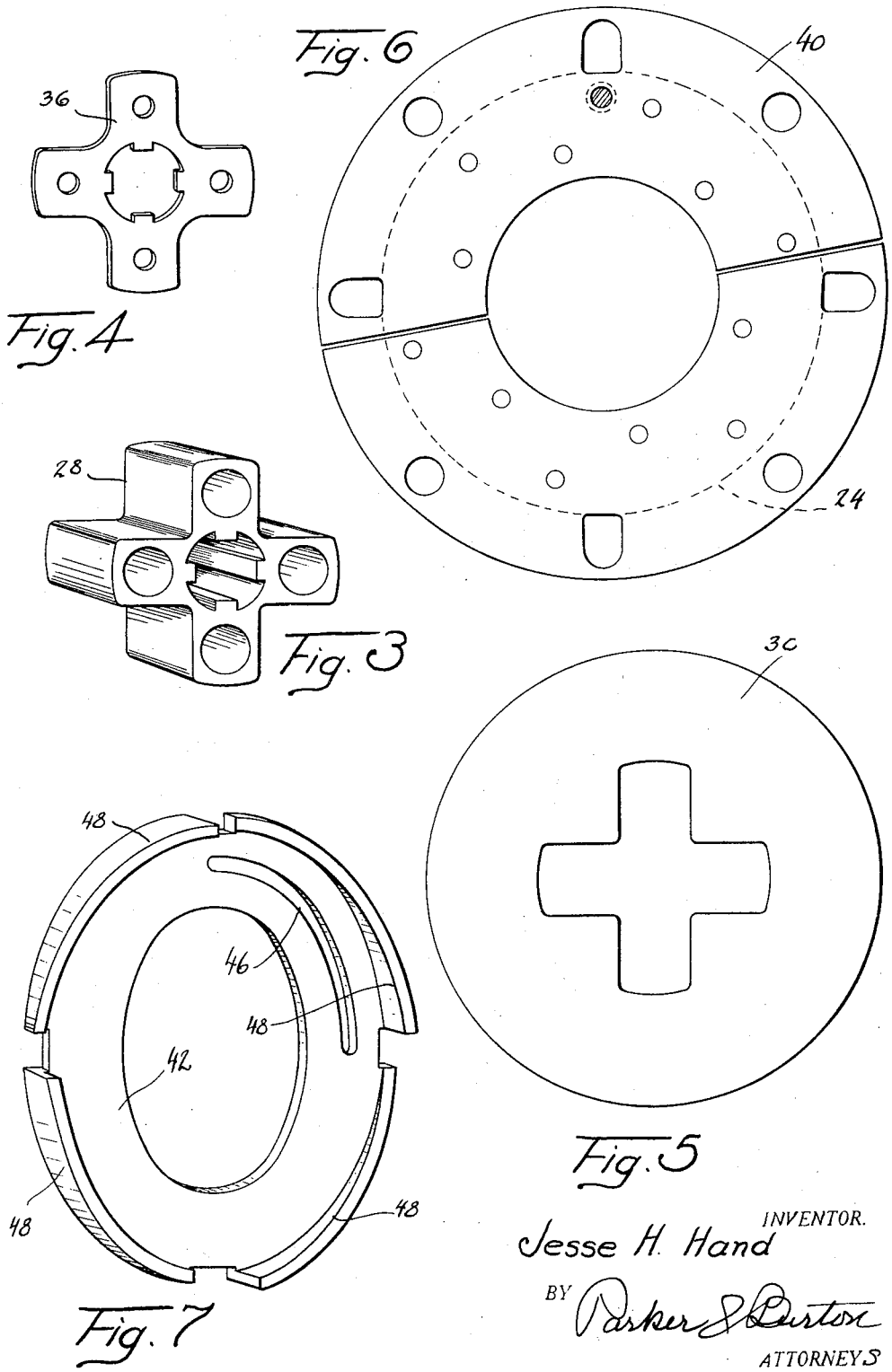

Patented Dec. 26, 1933

1,940,947

UNITED STATES PATENT OFFICE 1,940,947

CLUTCH MECHANISM

Jesse H. Hand, Chicago, Ill.

Application June 1, 1931. Serial No. 541,275

6 Claims. (Cl. 192—110)

My invention relates to clutch mechanism and particularly to that type known as the multiple plate clutch commonly used on automotive vehicles in connection with the transmission of power to the rear wheels.

An object of my invention is to facilitate the adjustment of the normal pressure existing between the clutch plates when they are in position to transmit the power from the engine to the rear wheels. Due to the wear of the clutch plates which occurs rapidly with some forms of traffic driving unsatisfactory operation of the clutch mechanism results. Usually this condition may be remedied by simply tightening up the clutch, or in other words, adjusting the pressure which normally tends to urge the friction plates together. My invention pertains to the improvement and simplification of this adjusting means so that it is readily accessible and manipulable.

A further object of my invention is to so locate the means which tend to urge the friction plates against one another that the pressure is distributed more uniformly over the plates, this being in contradistinction to the usual method of applying the actual pressure centrally of the plates. In this way I succeeded in obtaining a more evenly distributed pressure through the plates and thus a more smooth and flowing action of the clutch plates as the clutch is thrown in. The well known tendency of automobile clutches to "grab" is largely eliminated through this novel distribution of pressure tending to urge the plates together.

Further objects and meritorious features of my invention will become apparent from the following description and accompanying drawings wherein like figures refer to like parts throughout the several figures and wherein:

Fig. 1 is a vertical sectional view through my clutch mechanism,

Fig. 2 is a section taken on the line 2—2 of Fig. 1,

Fig. 3 is a perspective of my driven clutch plate carrier,

Fig. 4 is a perspective of the thrust plate,

Fig. 5 is a front elevation of one of my driven clutch plates, and

Fig. 6 is a front elevation of a pair of segmental clutch plates with the rotatable camming adjustment element removed, and Fig. 7 is a perspective of my rotatable camming element.

In the drawings I have shown my improved clutch mechanism as being utilized to couple the drive shaft of the customary internal combustion engine with the aligned driven shaft thereof. The drive shaft 10 is provided with a fly wheel 12 within which a clutch plate carrier 14 is secured by means of the bolts 16. The carrier is provided with a plurality of plate supporting studs 18, each alternate one of which is provided at its extremity with an inwardly projecting nub 20, the purpose of which will be brought forth hereafter. These studs serve to slidably support a series of centrally apertured clutch plates 22, to the opposite sides of each of which is riveted a lining, or facing 24, of friction material. The driven shaft 26 has the plate carrier 28 keyed thereto, to which is secured a plurality of friction plates 30, (see Fig. 5) which form an interleaving with the plates 22.

As is clearly illustrated in Figs. 3 and 4 of the drawings, this driven plate carrier is cast in the shape of a cross, each leg of which is centrally apertured to receive a stud 32. These studs support at one extremity a thrust plate 34 and at the other end a thrust plate 36 (see Fig. 4). The studs are headed over at one end and provided with nuts 38 at the other.

Forming a portion of the extreme outer clutch is a plate 40. Inserted between this plate 40 and nubs 20 is the centrally apertured rotatable camming adjustment member 42, which is bolted to the said plate by means of the nut 44, the bolt therefor extending through the slot 46 in the camming member and being welded to outer member 40. As clearly illustrated in Fig. 7 the circumference of this camming member is provided with four flanges 48, each of which gradually increases the distance which it projects laterally of the plane of the member and thus forming a camming surface. The outer periphery of the said member 42 is provided with a plurality of notches corresponding to the number of nubs provided on the studs 18 and spaced in such a way that the member 42 may be slid over the nubs and by a slight rotation secured by them to the clutch assembly.

Splined to the driven shaft 26 is the thrust bearing 50 which bears against the nuts 38. The springs 52 surround the stud members 32 and are seated on the inner extremities of the driven plate carrier 28 and the thrust plate 36, respectively.

Thus, in the normal position of the clutch as shown in Fig. 1 of the drawings, these springs which are spaced radially of the aligned shafts constantly tend to urge the thrust plate 34 towards the driven plate carrier 28 and thus maintain the friction discs in a state of constant compression, whereby the power of the one shaft is transmitted to the other.

When torque is applied to the shaft 54, the arm 56 secured to the said shaft urges the thrust bearing 50 to the left and as a result thereof, the studs 32 function to urge the thrust plate 34 in a similar direction, releasing the pressure which exists normally between the clutch plates. This structure has been described in greater detail in my copending application, Serial No. 483,160, filed September 20, 1930.

As is clearly illustrated in Figs. 2 and 6 the driving clutch plates 22 have been formed in two segments. This has been done for the purpose of more readily removing the plate, or one segment thereof at a time, and in this way securing ready access thereto for the purpose of renewing them, or relining them.

It is obvious that the spring members 52, which function to provide the pressure normally tending to compress the friction plates, are evenly distributed circumferentially of the clutch plates as well as radially of their center and for that reason a more even distribution of pressure through them is obtained.

The adjustment is accomplished by simply unscrewing the nut 44 sufficiently to permit rotation of the camming member 42, which rotational movement is limited to its useful extent by means of the slot 46. In this manner the normal pressure tending to compress the said clutch plates may be increased or decreased at will. This is an extremely simple and efficient method of remedying the so called "slipping clutch", and the means provided for so doing is extremely accessible.

I have illustrated and described a preferred embodiment of my device and various other modifications will be apparent to those skilled in the art, and for that reason I intend to limit myself only within the scope of the appending claims.

I claim:

1. Clutch mechanism including, in combination, a driving member having a plurality of circumferentially spaced projecting studs secured thereto, friction discs slidably positioned thereby said studs including at the outer extremities a projecting lug extending radially inwardly, a driven member positioned within the area defined by said studs and including friction discs secured thereto and interleaved with said first mentioned friction discs, yieldable means normally urging said friction discs into frictional engagement, and a camming plate positioned between the outer friction discs and the extremities of said studs, said camming plate including laterally extending cam portions adapted to engage said radially extending lugs.

2. Clutch mechanism including, in combination, a driving member having a plurality of circumferentially spaced projecting studs secured thereto, friction discs slidably positioned thereby, said studs including at the outer extremities a projecting lug extending radially inwardly, a driven member positioned within the area defined by said studs and including friction discs secured thereto and interleaved with said first mentioned friction discs, yieldable means normally urging said friction discs into frictional engagement, and a camming plate rotatably positioned between the outer of said friction plates and the extremity of said studs, said plate including camming means engageable with said radially extending lugs to force said plate axially upon rotation thereof.

3. Clutch mechanism including, in combination, a driving member having a plurality of circumferentially spaced projecting studs secured thereto, friction discs slidably positioned thereby, said studs including at the outer extremities a projecting lug extending radially inwardly, a driven member positioned within the area defined by said studs and including friction discs secured thereto and interleaved with said first mentioned friction discs, yieldable means normally urging said friction discs into frictional engagement, a camming plate rotatably positioned between the outer of said friction plates and the extremity of said studs, said plate including camming means engageable with said radially extending lugs to force said plate axially upon rotation thereof, and means associated with the end friction disc and cooperable with said cam plate to limit the rotary movement of the latter.

4. Clutch mechanism including, in combination, a driving member having a plurality of circumferentially spaced projecting studs secured thereto, friction discs slidably positioned thereby, said studs including at the outer extremities a projecting lug extending radially inwardly, a driven member positioned within the area defined by said studs and including friction discs secured thereto and interleaved with said first mentioned friction discs, yieldable means normally urging said friction discs into frictional engagement, a camming plate rotatably positioned between the outer of said friction plates and the extremity of said studs, said plate including camming means engageable with said radially extending lugs to force said plate axially upon rotation thereof, and cooperating means associated with the end friction disc and said cam plate operable to limit the rotary movement of the latter and fixedly position the same with relation to said friction disc.

5. In combination with mechanism of the class described, a plurality of circumferentially spaced studs, projecting lugs extending radially inwardly positioned at the extremity of each of said studs, and a camming plate positioned within the confines of said studs, said camming plate including laterally extending cam faces operable against said lugs upon rotation of said plate to vary the position thereof axially with respect to said studs.

6. Clutch mechanism including, in combination, a driving member having a plurality of circumferentially spaced projecting studs secured thereto, friction discs slidably positioned thereby, a driven member positioned within the area defined by said studs and including friction discs secured thereto and interleaved with said first mentioned friction discs, yieldable means normally urging said friction discs into frictional engagement, a plate positioned between the outer friction discs and the extremities of said studs, and means on said plate engageable with said studs for adjusting the engagement of the friction discs.

JESSE H. HAND.